United States Patent

Lilljeforss

[15] 3,636,994

[45] Jan. 25, 1972

[54] PNEUMATIC CONTROL DEVICE

[72] Inventor: Gustaf Lennart Lilljeforss, Lidingo, Sweden

[73] Assignee: AGA Aktiebolag, Lidingo, Sweden

[22] Filed: Mar. 16, 1970

[21] Appl. No.: 19,788

[30] Foreign Application Priority Data

Mar. 15, 1969 Sweden..................................3526/69

[52] U.S. Cl. ..............................141/83, 177/105, 177/116
[51] Int. Cl. ........................................B65b 1/32, B65b 3/28
[58] Field of Search .....................141/83, 359; 177/105, 116, 177/118

[56] References Cited

UNITED STATES PATENTS 2,931,614  4/1960  Charcuset et al. ......................177/118
3,297,061  1/1967  Nimee ....................................177/116

Primary Examiner—Houston S. Bell, Jr.
Attorney—Larson and Taylor

[57] ABSTRACT

A pneumatic control device for automatic charging of containers placed on a weighing machine with one or more substances. The control device comprises a manually operable starting valve actuating a delay circuit to operate the weighing machine. After this, a delay circuit together with a shutoff valve controlled by the weighing machine and arranged in a weighing valve circuit actuate a main valve in one of the supplying conduits, selected by an alternating or selecting circuit. Having charged all the determined substances the control device is reset to the initial position by a reset circuit giving an impulse to the starting valve.

11 Claims, 4 Drawing Figures

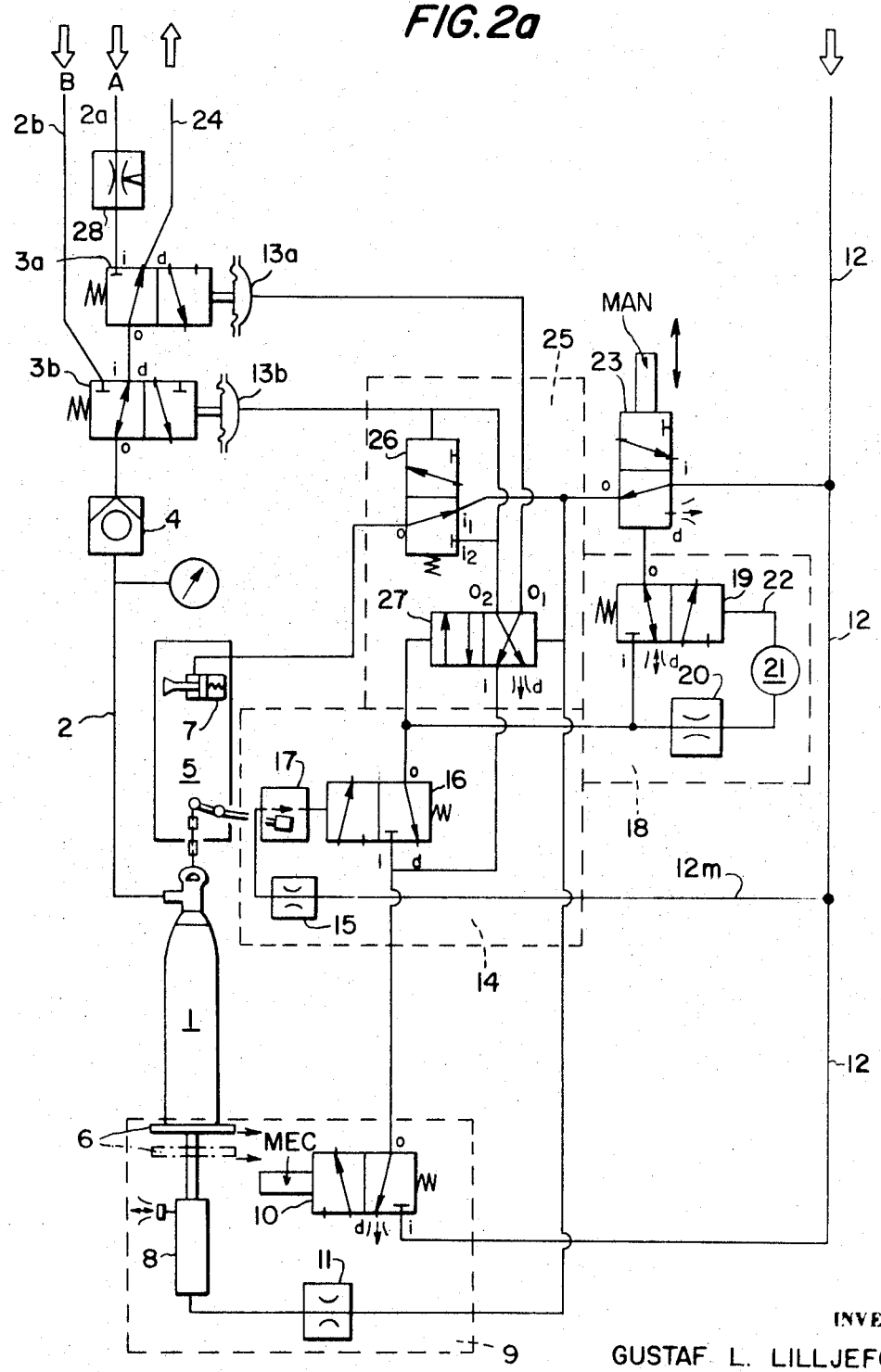

PNEUMATIC CONTROL DEVICE

BACKGROUND OF THE INVENTION

The invention relates to a pneumatic control device for automatic charging of containers with one or more substances supplied through one or more supply conduits.

In connection with the automatic charging of containers, when control devices of the type referred to were used, the charging process was conventionally started mechanically and was terminated by the weighing machine being of the linear type. This has certain disadvantages, which made it possible to use automatic charging of containers only in some very special processes. One drawback is that the operator attending to the starting of the process must place the container very accurately in the charging station so as to make it stand completely on the weighing machine. If it is not in correct position, the container may be overcharged and under extreme conditions the charging will not stop until this is done manually. A further considerable drawback is that linear weighing machines are expensive to manufacture. Another drawback is that conventional control devices are not suitable for supplying consecutively a plurality of substances, for instance substances which are to be mixed in the container but cannot be mixed before being supplied to the container.

SUMMARY OF THE INVENTION

Thus, it is a purpose of this invention to provide a new and improved control device which overcomes the disadvantages of previous control devices used for charging containers.

The control device according to the invention is characterized by a manually operable starting valve for rendering operable the weighing machine and permitting actuation of a delay circuit, the actual actuation of the delay circuit occurring upon operation of the weighing machine so as to open a main valve provided in each supply conduit for supplying substances to the container, a two-way weighing valve being provided in response to the complete charging of the container to reset the starting valve by means of a reset circuit, thereby closing the corresponding main valve.

In this manner there is obtained a simple and dependable control device for charging a container. An example of a weighing machine which is suitable for this purpose is the preadjustable linear weighing machine according to Swedish Pat. application No. 11554/67, which corresponds to U.S. Pat. application Ser. No. 752,029, filed Aug. 12, 1968, now U.S. Pat. No. 3,536,152.

In accordance with a main feature of the present invention, this control device is operable not only for a single substance but for supplying consecutively to a container a plurality of substances along separate conduits. This is especially important where the substances cannot be mixed before being introduced into the container. Further, a feature of the present invention is the provision of a control device which is applicable to an unlimited number of substances each supplied from its own conduit to the container. This advantage of the present invention of supplying a plurality of substances is provided by including in the control device as described above a pneumatic alternating circuit or a switching circuit between the delay circuit and the main valves. This alternating or switching circuit can take many different forms, some of which are described below in the description of the preferred embodiments of the invention.

Thus, it is an object of this invention to provide a new and improved control device for supplying substances to a container.

It is another object of this invention to provide a new and improved control device for automatically supplying any number of substances, each through their own respective conduits, to a container.

It is another object of this invention to provide a pneumatic control device for supplying substances to a container, said device including a starting valve for commencing operation of the filling cycle and including a delaying means for delaying opening of the conduits from the substances to the container and including a reset means, operable in response to the filling of the container for resetting the said starting valve.

It is another object of this invention to provide a pneumatic control device for automatically charging a plurality of substances to a container, each substance through a separate conduit, wherein the device includes a starting valve, a delay means which acts in response to the starting valve to open the conduits to the container, a reset means operable in response to the filling of the container to reset the starting valve, and a switching means between the delay means and the conduit valves for consecutively opening the respective conduits to the container.

Other objects and advantages of the present invention will become apparent from the detailed description to follow together with the accompanying drawings.

BRIEF DESCRIPTION OF THE DRAWINGS

Preferred embodiments of the invention are described below with reference to the attached drawings.

FIG. 2a is a diagram of a control device for consecutively supplying two substances through separate conduits.

FIG. 2b is a diagram of a modified form of the device according to FIG. 2a.

DETAILED DESCRIPTION OF THE PREFERRED EMBODIMENTS

The drawings show the various embodiments of control devices in connection with charging gas and liquid into containers. It is obvious that the control devices can be used for charging containers of any type with liquid as well as gases or solid substances. If the latter are of granular or powdery material which can be conveyed in conduits, the flow thereof can be controlled by valves of the type described below. If the main valves (to be described below) are replaced by motor- or vibrator driven conveyors or fluidizing powder conveyors, the device is also able to handle solid substances of coarser structure.

Figure 1:
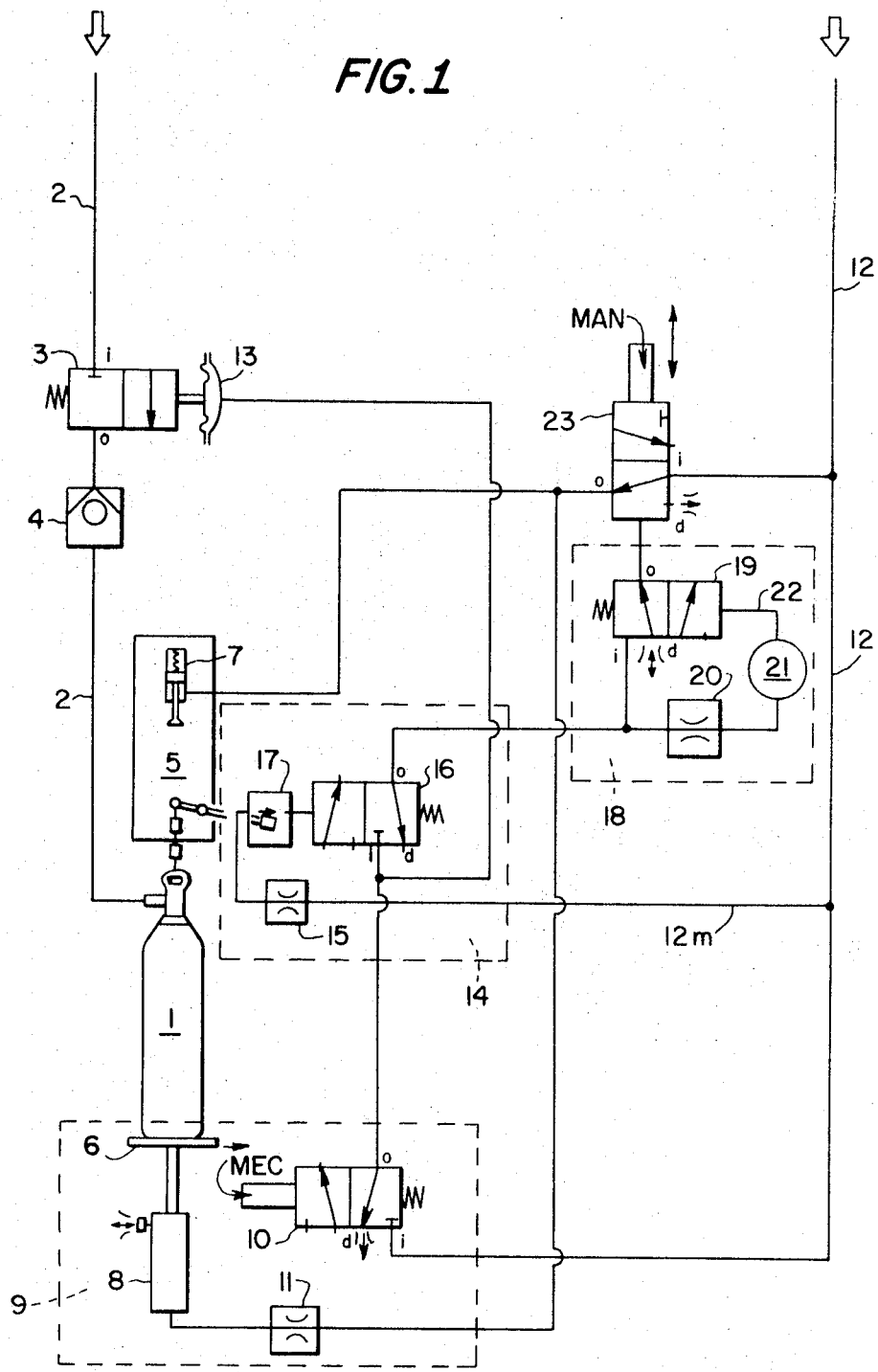
FIG. 1 is a diagram of a control device for charging a container with one or more substances supplied through a supply conduit.

The control device shown in FIG. 1 is adapted for charging a container 1 with one or more substances supplied through a conduit 2. Provided in supply conduit 2 is a main valve 3 and a nonreturn valve 4. Container 1 is secured in a weighing machine 5 shown schematically in said U.S. Pat. No. 3,536,152. In the original position, before beginning of the charging process, the container is also supported by a vertically adjustable table 6. The control device comprises a manual two-way starting valve 23 with pneumatic reset. The output conduit $23_o$ of starting valve 23 is connectable to the inlet $23_i$, which in its turn is connected through a pressure conduit 12 or to drain $23_d$, and is coupled to an arresting means 7 for releasing a counterweight (not shown) of weighing machine 5 and also to a pneumatic cylinder 8 for adjusting table 6. Table 6 forms part of a delay circuit 9 also comprising a choke valve 11 and a control valve 10 with spring reset, which is mechanically actuated by table 6. The outlet $10_o$ of control valve is connectable either to pressure conduit 12 at the inlet side $10_i$ or to a drain $10_d$. Outlet $10_o$ is connected to a pressure chamber 13 for controlling main valve 3, which is spring-reset, and also to the inlet side $16_i$ of a control valve 16 provided in a weighing valve circuit 14 which is controlled by weighing machine 5. Circuit 14 preferably comprises a choke valve 15 provided in control conduit $12_m$, which is connected to pressure conduit 12. Control conduit $12_m$ is connected to control valve 16 via a shutoff valve 17 controlled by weighing machine 5. The pneumatically controlled control valve 16 is spring-reset and its output $16_o$ is connectable to the inlet $16_i$ or the drain $16_d$. Output $16_o$ is connected to a reset circuit 18 comprising a choke valve 20 and an accumulator 21 provided in the control conduit 22 of a pneumatically actuated and spring reset valve 19, which is provided in the reset circuit 18. The connection of reset circuit 18 with valve output $16_o$ is divided, so that it is connected on the one hand with control conduit 22 and on the other hand with the inlet $19_i$ of valve 19. The output $19_o$ of reset valve 19 is connectable either to the inlet $19_i$ or to the drain $19_d$. Output $19_o$ is connected to the control conduit of starting valve 23.

FIG. 1 shows the valves in their initial positions wherein pressurized fluid is supplied through valve 23 to arresting means 7 and cylinder 8. After container 1 has been secured to weighing machine 5 and connected to conduit 2, which is then closed by main valve 3, the weighing machine is preadjusted and manual starting valve 23 is pushed, whereupon arresting means 7 now connected to drain locks the counterweight in the position corresponding to the preadjusted weight at the same time as cylinder 8 is connected to drain to lower table 6, so that the weighing machine 5 takes up the entire weight of the container. When table 6 passes mechanically controlled valve 10, it actuates it and causes main valve 3 to open as pressurized fluid passes through 12 and 10 to 13. When a certain quantity of substance or substances has been charged into the container, weighing machine 5 is balanced and thus acts to open shutoff valve 17, whereby control valve 16 is actuated by pressurized fluid through $12_m$. This causes accumulator 21 to supply pressure medium from conduit 12 and valve 19 to be actuated, whereby pressure medium is also supplied to the control conduit of starting valve 23, which is then reset. In the initial position of starting valve 23, the counterweight of weighing machine 5 is released by arresting means 7 and table 6 is raised, control valve 10 being then placed in the initial position and the pressure medium for actuation of main valve 3 being drained off through drain $10_3$, whereby main valve 3 is also reset. With machine 5 no longer balanced, 17 closes and 16 is reset by the spring to the illustrated position. Valve 19, then having line 22 connected to drain, also resets.

FIG. 2a shows an embodiment of the control device according to the invention for consecutively controlling a pair of substances A and B to be charged into container 1. In FIG. 2a, as in all subsequent figures, details corresponding in function to those described with reference to FIG. 1 are designated correspondingly. The control device is supplemented with an alternating circuit 25 comprising a control valve 26 and an auxiliary valve 27. Control valve 26 is pneumatically actuable by means of auxiliary valve 27 and has a spring reset. The control valve 26 has an outlet $26_o$ connected to arresting means 7 and connectable either to the inlet $26_{i1}$ which is connected to output $23_o$ of starting valve 23, or to the inlet $26_{i2}$ connected to the output $27_{o2}$ of auxiliary valve 27. Valve 27 is controlled pneumatically by starting valve 23 and weighing valve circuit 14. It has a pair of outputs $27_{o1}$ and $27_{o2}$, which are alternatively connectable to an inlet $27_i$ and to a drain $27_d$. Output $27_{o1}$ is connected to a chamber $13a$ to control main valve $3a$ described below and output $27_{o2}$ is connected to the control conduit of control valve 26, one inlet $26_{i2}$ of control valve 26 as well as to a chamber $13b$ of a main valve $3_b$ described below. Inlet $27_i$ is connected to the output $10_o$ of control valve 10.

In the embodiment shown, supply conduit 2 is divided upstream of the main valve into a pair of branches $2_a$ and $2_b$ for one each of substances A and B. Also, a drain conduit 24 is provided. The main valve also comprises a pair of valves $3_a$ and $3_b$ for the two substances, and which are controlled by corresponding pressure chambers $13_a$ and $13_b$ and are provided with spring reset. Provided in one of the main conduits is a choke valve 28 for preventing the pressure from decreasing in conduit $2_a$ to such an extent that the supply of medium A is interrupted to charging positions connected in parallel to the one shown and the containers of which have higher initial pressures. Main valve $3_a$ has an output $3_{ao}$ which is connectable either to the inlet $3_{ai}$, which is connected to main conduit $2_a$, or to the drain $3_{ad}$, which is connected to drain conduit 24. Output $3_{ao}$ is connected to the drain $3_{bd}$ of main valve $3_b$. Main valve $3_b$ also has an output $3_{bo}$, which is connectable either to the inlet $3_{bi}$ thereof connected to main conduit $2_b$ or to the drain $3_{bd}$ thereof, which is connected to output $3_{ao}$ of main valve $3_a$. Output $3_{bo}$ of main valve $3_b$ is connected through one-way valve 4 to conduit 2 leading to container 1.

To operate the device of FIG. 2a, valve 23 is first pushed, whereby the same sequence takes place as described in connection with FIG. 1, i.e., arresting device 7 releases the counterweight, table 6 is lowered and valve 10 is actuated. Upon actuation of control valve 10, main valve $3_a$ is actuated through valves 10 and 27 and the charging of substance A in container 1 takes place up to a predetermined amount. After this, weighing machine 5 is balanced and thus opens shutoff valve 17 whereby valve 16 shifts to the right. This in turn permits pressure fluid to actuate auxiliary valve 27, causing movement of both main valves $3_a$ and $3_b$. Valve $3_a$ will drain through 27 and move to the position shown and valve $3_b$ will be actuated in the opposite position to the one shown, for supplying medium B. Owing to the actuation of valve 16, two additional valve actuations take place: first, because of said actuation of valve 27, control valve 26 is actuated, causing the release of the counterweight of weighing machine 5 by means of arresting means 7 as pressure is now supplied through 27 and 26 to 7; and, second, reset circuit 18 is actuated. However, in view of the inherent delay thereof this has no effect. This is so because when arresting means 7 is released, weighing machine 5 is again unbalanced, which closes shutoff valve 17 and causes control valve 16 to be spring biased again to the shown position. However, this does not otherwise affect the control valve 26, since valve 27 remains in the actuated position since the pressure on both sides of auxiliary valve 27 is the same (both sides are decompressed via $23_d$ and $16_d$).

When medium B has been supplied to container 1 up to a predetermined amount, weighing machine 5 is again balanced, valve 17 opens, and valve 16 is actuated to the right. This causes starting valve 23 to be reset by reset circuit 18, cylinder 8 raises table 6 as well as container 1, valve 10 closes and valve 17 closes again. Control valve 16 is then brought into the position shown and auxiliary valve 27 reassumes the position shown, since an overpressure is now available in the actuating conduit leading from starting valve 23. Line 22 is drained through $16_d$ so that 19 returns to the position shown. Main valve $3_b$ reassumes the position shown and main valve $3_a$ remains in the position shown, so that the supply is entirely interrupted and the control device is back in the original state prepared for a fresh charging process.

It is possible to remove control valve 26 from alternating circuit 25 if arresting means 7 of weighing machine 5 is adapted to have friction contact with the preadjusting means already during the manual preadjustment of the weighing machine. In this case, arresting means 7 is coupled pneumatically to the conduit between pressure chamber $13_b$ and output $27_{o2}$ of valve 27. Outputs $27_{o1}$ and $27_{o2}$ of auxiliary valve 27 have then changed places and the initial position of auxiliary valve 27 is the opposite to the one shown in FIG. 2a.

Another simplification of the control device shown in FIG. 2a consists in removal of reset valve 19, which is possible provided that accumulator 21 has a capacity which is large enough.

Figure 2B:
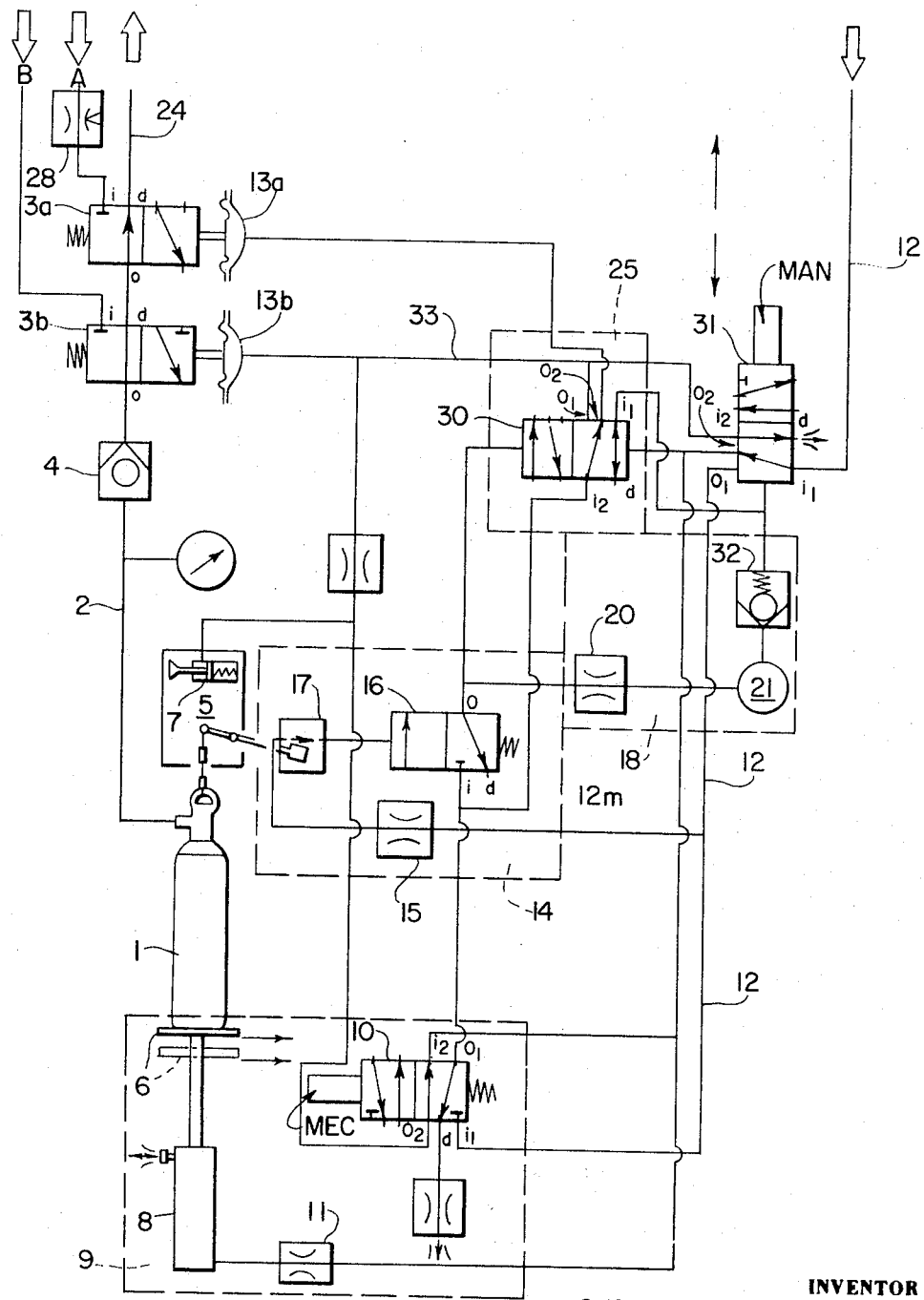

FIG. 2b shows another embodiment of an automatic control device for charging a pair of substances into a container according to the invention. The control circuit has, as described above, a manual starting valve designated in the present instance with 31, the pneumatic reset of which is controlled by reset circuit 18. Valve 31 has an inlet $31_{i1}$ connected to the conduit 12 for the pressure medium and the drain $31_d$ having a pair of outputs $31_{o1}$ and $31_{o2}$. The pressure medium in conduit 12 is hereby controlled completely by the control valve which in its closing position also shuts off conduit 12, the latter being furthermore connected between the output $31_{o1}$ of the starting valve, the weighing valve circuit 14 and an inlet $10_{i1}$ of the mechanically actuated control valve 10. The other output $31_{o2}$ of the starting valve is connected to one control conduit of the actuating valve 30 of the pneumatically controlled alternating circuit 25. Outputs $31_{o1}$ and $31_{o2}$ can be alternately connected to inlet $31_{i1}$. Output $31_{o2}$, in one position thereof, is connected to drain $31_d$. Starting valve 31 is provided with an additional inlet $31_{i2}$, which is connectable to drain $31_d$.

Reset circuit 18 in FIG. 2b is of a somewhat modified construction, reset valve being constructed as a biased nonreturn valve 32 which opens only when a certain pressure has been reached in accumulator 21.

Delay circuit 9 is in principle constructed as in FIG. 2a. The mechanically controlled control valve 10, however, is provided, in addition to inlet $10_{i1}$ referred to above, with an additional inlet $10_{i2}$ which is connected to the outlet $31_{o2}$ of starting valve 31. Also provided are a pair of outputs $10_{o1}$ and $10_{o2}$, $10_{o1}$ being connected to an input $30_{i2}$ of actuating valve 30 as well as via inlet $16_i$ and outlet $16_o$ of control valve 16 to one control conduit of actuating valve 30. Output $10_{o2}$ is connected to arresting means 7 and via a choke valve to a conduit 33, which connects the chamber $13b$ of main valve $3_b$ with an output $30_{o1}$ of actuating valve 30 and through $30_{o1}$ to drain $10_d$ and inlet $31_{i2}$ of starting valve 31. Inlet $10_{i2}$ is alternately connected to the output $10_{o2}$ or to drain $10_d$ and output $10_{o1}$ is alternately connectable to drain $10_d$ or to inlet $10_{i1}$.

Alternating circuit 25 in the embodiment described comprises only an entirely pneumatically actuated actuating valve 30 having two inlets $30_{i1}$ and $30_{i2}$, $30_{i1}$ being connected to the reset circuit for starting valve 31 and $30_{i2}$ to output $10_{o1}$ of control valve 10. Furthermore, actuating valve 30 comprises a drain $30_d$ and a pair of outputs $30_{o1}$ and $30_{o2}$, $30_{o1}$ being connected to conduit 33 and $30_{o2}$ to the actuating device of main valve $3_a$. Inlet $30_{i2}$ is alternatively connectable to output $30_{o1}$ or to output $30_{o2}$. Inlet $30_{i1}$ is connectable in one position to drain $30_d$ and output $30_{o2}$ is alternately connectable to inlet $30_{i2}$ or to drain $30_d$.

The operation of the control device of FIG. 2b is largely the same as that described with reference to FIG. 2a. When starting valve 31 is pushed, $31_{o2}$ is connected to drain $31_d$ whereby table 6 is lowered, causing container 1 to be suspended freely in weighing machine 5 at the same time as the arresting means 7, connected to drain through $10_{o2}$, $10_{i2}$ and $30_{o2}$ retains the weight that had previously been adjusted. Control valve 10 is actuated by table 6 when it is lowered, causing pressure medium to be supplied from $31_{o1}$, through output $10_{o1}$ via inlet $30_{i2}$ and output $30_{o2}$ to the actuating device of main valve $3_a$, the actuation of which causes substance A to be supplied through $3_b$ and line 2 to container 1. When a certain weight of substance A has been supplied, valve 17 opens and control valve 16 is actuated by pressure through $12_m$, causing an impulse to be supplied from 12 through $10_{i1}$, $10_{o1}$, $16_i$ and $16_o$ for actuation of actuating valve 30 to the right. Actuation of valve 30 causes valve $3_a$ to be connected to drain through $30_{o2}$ and $30_d$ such that $3_a$ then assumes the position shown, and main valve $3_b$ receives an impulse through $30_{i2}$ and $30_{o1}$ causing it to assume the opposite position to the one shown, whereupon substance B begins to be charged into the container through $3_b$ and line 2. Simultaneously herewith, arresting means 7 also receives pressure fluid from $30_{o1}$ and 33 and releases the arresting device of weighing machine 5 causing the same to be adjusted for the predetermined weight of substance B and valve 17 again closes, causing spring actuation of control valve 16.

All of the functions referred to take place swiftly between the first and second actuation of the control valve 16, so that starting valve 31 is not reset owing to the fact that this is done with a certain delay in delay circuit 18.

When the predetermined amount of substance B has been charged, control valve 16 is again pressure actuated to the right, but nothing happens until accumulator 31 of delay circuit 18 builds up a sufficient pressure to open valve 32, thereby resetting valve 31. This causes conduit 33 to be drained through drain $31_d$ and main valve $3_b$ is moved to the position shown, whereby no supply to the container 1 can take place. The return of starting valve 31 also supplies pressure to table 6 to raise the same and control valve 10 is spring actuated to the left, causing the other valves that have not yet been reset to be reset. For example, 30 is now moved to the left by pressure from 31 on its right side as its left side is connected to drain $16_d$. The control device is then prepared for a fresh charging process.

Figure 3:
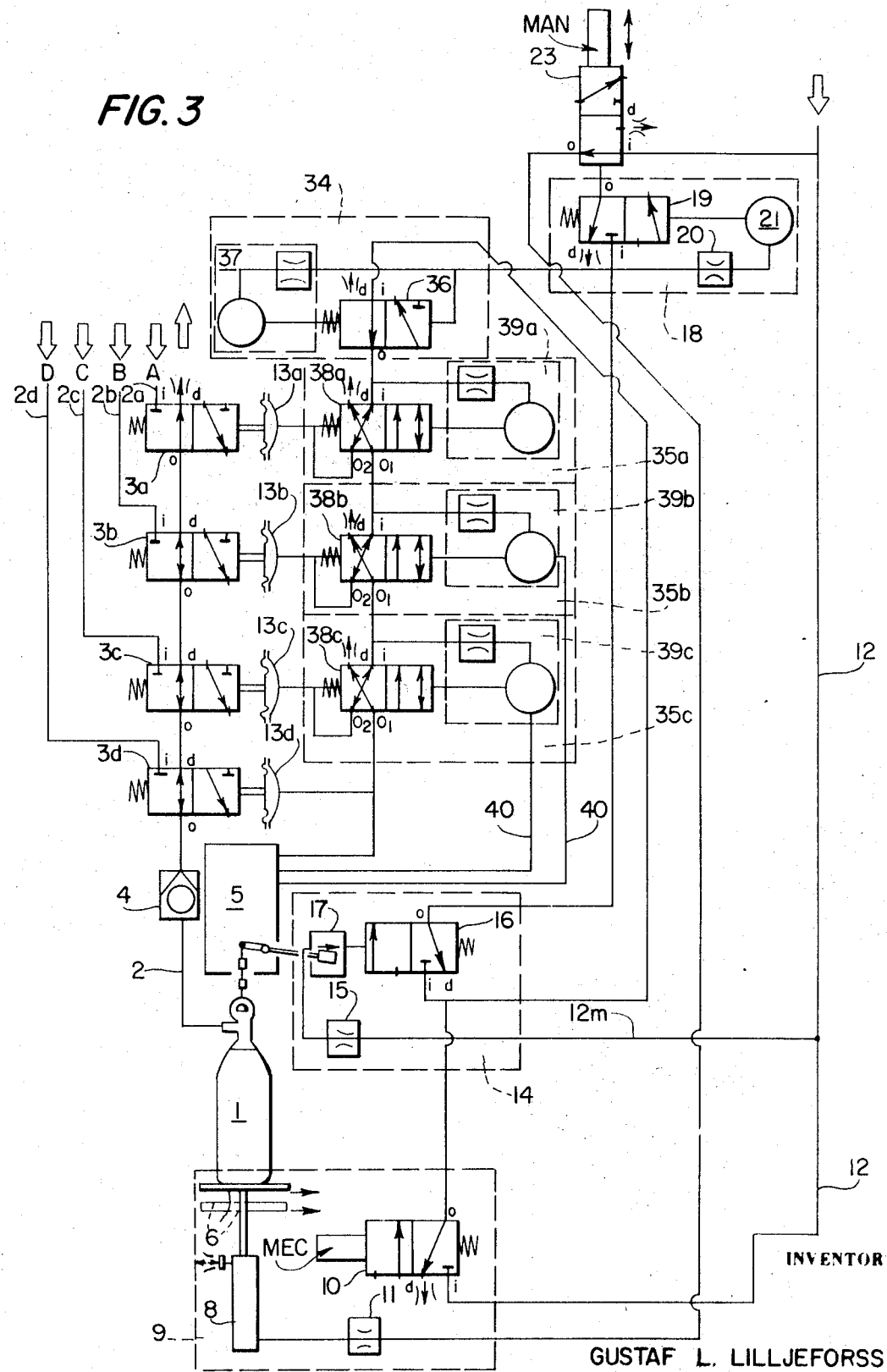
FIG. 3 is a diagram of a control device adapted for an unlimited number of substances to be consecutively supplied through separate conduits.

FIG. 3 shows an embodiment of the control device for subsequent charging with a plurality of substances A, B, C and D. The circuits of the control device are in accordance with FIG. 2a with the exception of alternating circuit 25, to which additions have been made. In addition to a preselection circuit 34 forming part of alternating circuit 25 a number of auxiliary switching circuits 35 are provided, whose number is always the number of substances to be charged into container 1 minus one.

Preselection circuit 34 comprises a pneumatically actuated preselection valve 36, the control circuit of which is connected to output $16_o$ of control valve 16. Connected to one side of the control circuit is a delay device 37. Preselection valve 36 comprises an inlet $36_i$ connected to output $10_o$ of control valve 10, an output $36_o$ connected to the inlet $38_i$ of an auxiliary switching valve $38_a$ described below, as well as a drain $36_d$. Output $36_o$ can be connected alternately to inlet $36_i$ and to drain $36_d$.

Each auxiliary switching circuit 35 comprises, in addition to the auxiliary switching valve 38 referred to above, and which is actuated pneumatically, a delay circuit 39 provided in one of the pneumatic control conduits. Delay circuit $39_a$ is connected to the output $36_o$ of preselection valve 36. Valve $38_a$ comprises an inlet $38_{ai}$, connected to the output $36_o$ of preselection valve 36, a drain $38_{ad}$ and a pair of outputs $38_{ao1}$ and $38_{ao2}$. Output $38_{ao1}$ is connected to the inlet $38_{bi}$ of the following auxiliary switching valve $38_b$ and output $38_{ao2}$ to the actuating device $13_a$ of the corresponding main valve $3_a$ as well as to the other actuating conduit of the same auxiliary switching valve $38_q$. Inlet $38_{ai}$ is alternately connectable to outputs $38_{ao1}$ and $38_{ao2}$ these outputs being alternately connectable to inlet $38_{ai}$ as well as to drain $38_{ad}$. Preferably connected from delay circuits 39 are actuating conduits 40 leading to weighing machine 5 for actuating stops provided on the preadjusting device of the same, the stops serving for preadjustment of desired quantities of each substance to be charged into container 1. No actuating conduit 40 has to be provided from the delay circuit $39_a$ which is nearest to preselection circuit 34, since delay circuit $39_a$ belongs to switching circuit $35_a$, which is the first one to open its corresponding main valve $3_a$. Since it is the first one, it does not have to remove any stop on the preadjustment device provided for weighing machine 5 for automatically cutting the supply of a substance previous to substance A.

The operation of the control device of FIG. 3 is, during the first phase thereof, in accordance with that of the control device of FIG. 2a described above with respect to pushing valve 23 to actuate 7 and 6 and hence actuate valve 10. However, in this case, pressure fluid through 10, rather than passing through 27 passes to valve 36, and through 36 and 38 to $13_a$ to operate valve $3_a$. During the supply of substance A, preselection valve 36 is in the position shown, in which the pressure medium acts through 23, 10, 36 and $38_a$ on the actuating device of main valve $3_a$ as well as on the delay circuit $39_a$ of the corresponding auxiliary switching valve $38_a$, whereby main valve $3_a$ is moved to the left to pass substance A. When substance A has been supplied in the desired amount, valve 17 is opened to actuate valve 16 in the manner already described, resulting in an impulse being applied first to the right side of preselection valve 36 placing it in the opposite position to the one shown, and after a certain delay caused by 37 pressure is applied to the left side of 36 replacing it to the position as shown. In the opposite position of preselection valve 36, chamber $13_a$ of main valve $3_a$ together with the left-hand actuating conduit of switching valve $38_a$ is drained via output $38_{ao2}$ and inlet $38_{ai}$, causing a return of the main valve $3_a$ to the position shown. Owing to the delay of device $39_a$, the right-hand actuating conduit of auxiliary switching valve $38_a$ is not drained but the valve $38_a$ is actuated, i.e., moved to the left. The delays of devices $37_a$ and $39_a$ are related in such a way as to make it possible for switching valve $38_a$ to be actuated without being reset before valve 36 has been reset.

When valve 36 has been reset, pressure medium is supplied to the following auxiliary switching valve $38_b$ and the chamber $13_b$ of the corresponding main valve $3_b$ is actuated for supply of substance B, at the same time as the foregoing auxiliary switching valve $38_a$ remains open. This causes charging of the delay circuit $39_a$ of the following auxiliary switching valve $39_b$, the stop which has been preadjusted corresponding to the weight of substance A on the preadjusting device of the weighing machine being then removed, causing the preadjusting device of weighing machine 5 to adjust itself in contact with another stop, which has been preadjusted corresponding to the weight of substance B. Weighing machine 5 then becomes unbalanced and control valve 17 is opened, permitting actuation of valve 16 as already described with reference to FIG. 2a. When substance B has been supplied in the desired quantity, weighing machine 5 once again becomes balanced and the same automatic control process which was just described in connection with the completed supply of substance A is now restarted with the following auxiliary switching valve $38_c$ with the corresponding main valve $3_c$. It will be apparent that it is possible in this manner to consecutively charge any number of substances to the container in an automatic manner by simply supplying further circuits 35 and their associated parts.

As is apparent from the preferred embodiments of the invention described above, variations are possible within the scope of the claims. For instance, it is possible within the scope of the invention to use fluidistors or hydraulic components as control elements.

I claim:

1. A pneumatic control device for controlling the charging of a container with at least one substance supplied through at least one conduit to the container, comprising, a preselected means for preselecting desired quantities of said substance, a starting valve movable at least between a rest position and an actuated position, a weighing means for supporting the weight of the container and having an operative position and an inoperative position, said weighing means being movable to its operative position in response to movement of the starting valve to its actuated position, a delay circuit means operable in response to movement of the starting valve to its actuated position and after a predetermined time delay to open a main valve to supply said substance to the container through the conduit, said delay circuit means comprising a table which is adjustable vertically for supporting the container before the weighing means is moved to its operative position, movement of the table being controlled by a fluid signal through the starting valve to actuate a delay control valve provided in the delay circuit means for supplying a fluid pressure signal to open the main valve, and a reset circuit means for returning the starting valve to its rest position in response to the filling of said container with said preselected quantity, and means for closing the said main valve after the container has been filled with said preselected quantity.

2. A control device according to claim 1 including a plurality of said conduits, each conduit supplying a substance to the container, one main valve being included to control each conduit.

3. A control device according to claim 2, including a switching circuit means operatively located between the delay circuit means and the main valves for providing consecutive actuation and resetting of the main valves to provide consecutive supply of substances through said plurality of conduits to the container.

4. A control device according to claim 3, including a weighing valve actuated when the container is filled to said predetermined quantity, and wherein said switching circuit means includes a switching valve operated by a pressure signal through the starting valve and another pressure signal through the weighing valve.

5. A control device according to claim 3 including a weighing valve actuated when the container is filled to said predetermined quantity and wherein the number of main valves equals the number of conduits supplying substance to the container, the main valve being pneumatically actuable two-way valves arranged to supply one substance at a time to the container.

6. A control device according to claim 3, including a weighing valve actuated when the container is filled to said predetermined quantity, and wherein the switching circuit means comprises a manually actuable two-way valve with pneumatic reset in response to the weighing valve.

7. A control device according to claim 3, including a weighing valve actuated when the container is filled to said predetermined quantity, and wherein the switching circuit means further includes a two-way auxiliary valve controlled by fluid from the starting valve and fluid from the weighing valve, and a switching control valve with spring reset which is controlled by fluid from the auxiliary valve.

8. A control device according to claim 3, including a preselection valve for delivering pressure fluid from the delay means to the switching circuit means, said switching circuit means including a number of pneumatic two-way switch control valves arranged in a monostable manner, one switch control valve being provided for each manual valve and hence one for each conduit, each switch control valve having associated therewith an accumulator and a choke provided in the return circuit to the control valve, the number of switch control valves being smaller by one than the number of conduits supplying substances to the container.

9. A control device according to claim 6, including a pneumatic disconnecting means operatively connecting the weighing means and the switch control valves to return each switch control valve when a preselected quantity of the substance supplied through the conduit associated with that switch control valve have been supplied to the container.

10. A control device according to claim 1, wherein the weighing means includes a weighing valve actuated when the container is filled to said predetermined quantity to deliver pressure fluid to said reset means, said pressure fluid being supplied to reset the starting valve through a two-way resetting valve operated in the one direction by pressure fluid from the weighing valve supplied through a delaying accumulator and said reset valve being spring actuated to the reset position.

11. A control device according to claim 1, including a weighing valve actuated when the container is filled to said predetermined quantity to deliver a signal, a plurality of said conduits, a main valve for each conduit, said main valves being arranged such that the first substance to be supplied passes through all of the said main valves, the second substance to be supplied passes through the second and all subsequent main valves, the third substance to be supplied passes through the third and all subsequent valves, and so on until the last substance to be supplied passes through only the last valve, an auxiliary switching valve operatively associated with each main valve, a preselection valve arranged to receive pressure fluid from the weighing valve and deliver the same to the auxiliary switching valves, said preselection valve being controlled on the one hand by fluid received directly from the first said delay means and on the other hand by fluid received indirectly through a delaying device from the first said delay means, said auxiliary switching devices being operable in sequence to operate the main valves in sequence and means connecting each auxiliary switching means to the weighing means in order to determine the point at which each auxiliary switching means will render its respective main valve inoperable and render operable the next main valve.

* * * * *